(12) United States Patent
Solomon et al.

(10) Patent No.: US 8,090,660 B2
(45) Date of Patent: Jan. 3, 2012

(54) PAY PER USE SECURITY BILLING METHOD AND ARCHITECTURE

(75) Inventors: Steven B. Solomon, Dallas, TX (US); Carl E. Banzhof, Dallas, TX (US)

(73) Assignee: McAfee, Inc., Santa Clara, CA (US)

( * ) Notice: Subject to any disclaimer, the term of this patent is extended or adjusted under 35 U.S.C. 154(b) by 1995 days.

(21) Appl. No.: 11/147,881

(22) Filed: Jun. 8, 2005

(65) Prior Publication Data
US 2006/0282388 A1   Dec. 14, 2006

(51) Int. Cl.
G06F 21/00   (2006.01)
(52) U.S. Cl. .............. 705/52; 705/51; 705/59; 705/64
(58) Field of Classification Search .............. 705/52, 705/59, 51, 64
See application file for complete search history.

(56) References Cited

U.S. PATENT DOCUMENTS

| 5,625,690 | A | * | 4/1997 | Michel et al. ............... 705/53 |
| 5,852,812 | A |   | 12/1998 | Reeder ......................... 705/39 |
| 6,049,789 | A | * | 4/2000 | Frison et al. ................. 705/59 |
| 6,237,786 | B1 | * | 5/2001 | Ginter et al. ................ 213/153 |
| 6,560,581 | B1 | * | 5/2003 | Fox et al. ..................... 705/51 |
| 7,133,845 | B1 | * | 11/2006 | Ginter et al. ................ 705/51 |
| 7,278,163 | B2 |   | 10/2007 | Banzhof et al. .............. 726/25 |
| 2005/0216957 | A1 |   | 9/2005 | Banzhof et al. .............. 726/25 |
| 2006/0101517 | A1 |   | 5/2006 | Banzhof et al. .............. 726/25 |

OTHER PUBLICATIONS

Lucas C. Ferreira and Richardo Dahab, Two Approaches for Pay-per-Use Software Construction, 2000 IEEE.*

* cited by examiner

Primary Examiner — Pierre Eddy Elisca
Assistant Examiner — Shahid Kamal
(74) Attorney, Agent, or Firm — Wong, Cabello, Lutsch, Rutherford & Brucculeri, L.L.P.

(57) ABSTRACT

A system is provided for use-based charging of security software. The system includes a security software, a monitor component, and a billing component. The security software provides security for a computer system, and the monitor component is operable to monitor use of at least a portion of the security software. The billing component is operable to charge based on the use of the security software monitored by the monitor component.

18 Claims, 2 Drawing Sheets

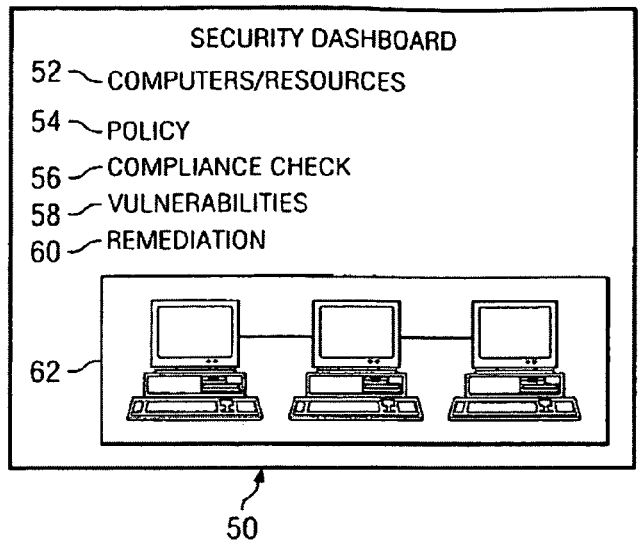
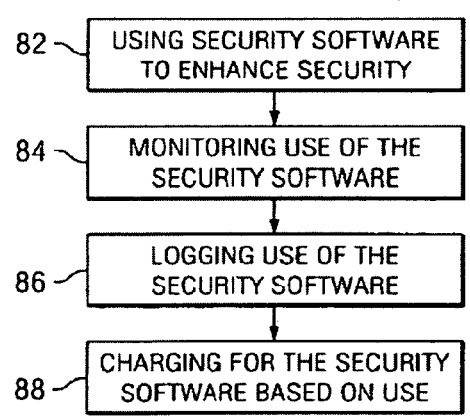
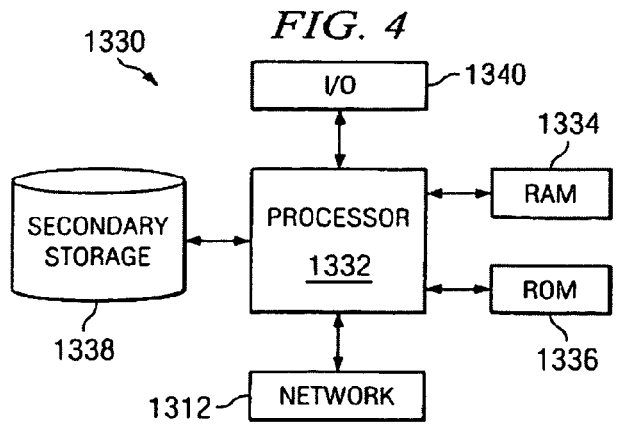

PAY PER USE SECURITY BILLING METHOD AND ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

The present system relates generally to the field of billing for computer software and more particularly, but not by way of limitation, to a system and method for charging for security software based on use.

BACKGROUND OF THE INVENTION

Computer software is developed and marketed under a number of different arrangements. For example, custom software may be contracted for by an organization that purchases the software outright upon completion or makes payments at certain milestones during development, but ultimately the organization owns all rights in the software. Software with wide commercial distribution is generally sold under terms of "shrink wrap" or limited licenses that limit how the software may be used and provide that the software developer maintains ownership of the software. Software can be provided under perpetual license arrangements where customers buy the perpetual right to use the software by making a one-time payment and then the customer makes periodic payments for access to maintenance and updates or upgrades of the software. Software is also marketed under subscription licenses where the customer purchases the right to use the software for a certain period of time by making periodic subscription payments, such as monthly or annually.

SUMMARY OF THE INVENTION

According to one embodiment, a system is provided for use-based charging of security software. The system includes security software, a monitor component, and a billing component. The security software provides security for a computer system, and the monitor component is operable to monitor use of at least a portion of the security software. The billing component is operable to charge based on the use of the security software monitored by the monitor component.

In one embodiment, a method is provided for charging for security software based on use. The method includes using the security software to enhance security for a computer, and charging based on the use of the security software to enhance the security of the computer.

In another embodiment, a system is provided for use-based charging of security software. The system includes a first and second security clients and a security server. The first security client is provided on a first customer computer, and the second security client is provided on a second customer computer. The security server is provided on a customer server. The first and second security clients and the security server are operable to enhance security on the first and second customer computers. The system also includes a billing component that is operable to charge based on use of one or more of the first and second clients and the security server to enhance security on the first and second computers.

These and other features and advantages will be more clearly understood from the following detailed description taken in conjunction with the accompanying drawings and claims.

BRIEF DESCRIPTION OF THE DRAWINGS

FIG. 2 is a diagrammatic illustration of a security dashboard, according to one embodiment of the present disclosure.

FIG. 3 is a flow chart of a method of charging based on the use of security software, according to one embodiment.

FIG. 4 is an exemplary computer system operable for implementing some of the various embodiments of the present disclosure.

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
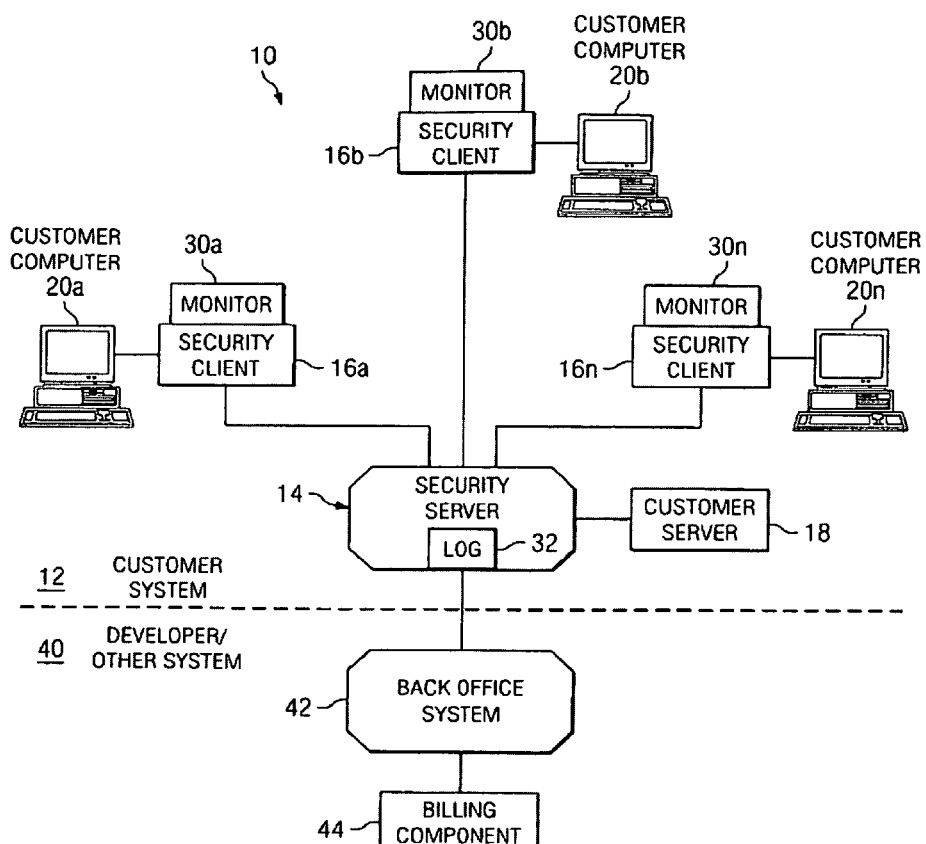
FIG. 1 is a block diagram, according to one embodiment, of a system for use-based charging of security software.

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Security software, for example, may be used by organizations facing network security challenges such as software defects, configuration errors, unnecessary services, unsecured accounts, backdoors and security policy compliance. Many organizations struggle with a lack of resources to research, discover, and repair vulnerabilities to their system. Security software operable to addresses these challenges include those disclosed in U.S. patent application Ser. No. 10/810,927 (now abandoned) to Banzhof et al. filed Mar. 25, 2004 entitled "Method and Apparatus for Protecting A Remediated Computer Network From Entry of a Vulnerable Computer System Thereinto", U.S. patent application Ser. No. 10/975,828 to (now abandoned) Banzhof et al. filed Oct. 28, 2004 and entitled "Inventor Management-based Computer Vulnerability Resolution System, and U.S. Pat. No. 7,278, 163 to Banzhof et al. filed Feb. 22, 2005 and entitled "Security Risk Analysis System and Method", all of which are incorporated herein by reference for all purposes. Such security software is operable to perform compliance checks to determine whether one or more computers adhere to predetermined security policies, as well as to identify vulnerabilities to these systems and remediate these vulnerabilities as necessary.

According to one embodiment, the present disclosure is directed to a system for use-based charging of such security software. The security software may include a monitor component which is operable to monitor the use of portions of the security software and a billing component that charges the customer based on the use of the security software monitored by the monitor component. This method of billing based on use of the system allows organizations that might not otherwise have access to robust security software to be able to utilize comprehensive security software and pay only for their use of the system.

FIG. 1 illustrates a system 10 according to one embodiment of the present disclosure for use-based charging of security software 12. The security software 12 may include various components, such as a security server 14 and one or more security clients 16. Although only three security clients 16 are shown, any number of security clients 16 may be provided. The security software 12 is operable for providing security for a computer system, such as a customer computer system which may include a customer server 18 and one or more customer computers 20. The security server 14 is shown deployed on the customer server 18, while the security clients 16 are each provided on the customer computers 20 in the present embodiment. It will be appreciated that the customer system may include additional servers and other computers or devices which are not shown. Although the present disclosure describes certain functionality as provided by the security server 14 and other functionality as provided by the security client 16, the functionality provided by the security software 12 is not dependent on which of these systems necessarily perform certain aspects.

The security server 14 may maintain, for example, security policies and remediation information used to secure the customer computers 20. The security clients 16 may communicate with the security server 14 to perform security policy compliance checks to determine whether the customer computers 20 are in compliance with the predetermined policies, as well as to perform vulnerability analysis. The security clients 16 are further operable to remediate vulnerabilities identified on the customer computers 20, either alone or in conjunction with the security server 14. The security clients 16 may each include a monitor 30 operable to monitor the use of at least a portion of the security software 12, such as the security client 16. The monitor 30 may keep track of, for example, each time a compliance check or remediation occurs. Although the monitor 30 is shown coupled to the security client 16, the monitor 30 may, in other embodiments, be provided as a separate module or as part of the security server 14.

The monitor 30 communicates the use information to the security server 14 which maintains a record in a log 32 of each use of, for example, any part of the security software 12. The log 32 includes a complete record of each use of the security clients 16 for each of the customer computers 20. In some embodiments, the log 32 may include information about the use of the security server 14 as well. The security software 12 may be operable for endpoint security and connection guarding, which may stop all traffic from remote or local computers, such as customer computers 20, reconnecting to the customer network and performs policy compliance checks and remediations of out-of-compliance machines before the computer is allowed to reconnect to the network.

The security server 14 communicates with a second system 40 such as the security software developer system or other system which is provided at a different location than the customer's location. The second system 40 may include a back-office system 42 and a billing component 44. The security server 14 may periodically batch, send on a transaction-by-transaction basis, or otherwise provide the information recorded in the log 32 or information abstracted from or based on information recorded in the log 32 to the back-office system 42. In other embodiments, the record of use or transaction log may be communicated between the security server 14 and the back-office system 42 via email, or otherwise. The communication between the back-office system 42 and security server 14 is conducted via a secure communication link, such as over an SSL (secure socket layer) connection. In some embodiments, this communication may be further augmented by using authentication, such as a signed token or other secure encrypted means of authentication.

The back-office system 42 may include or communicate with the billing component 44 which is operable to generate an invoice that charges the customer based on the use of the security software recorded in the log 32. Therefore, the customer pays for the security software 12 either entirely or predominately based on the customer's use of the security software 12 on the customer's system. In some embodiments, the customer may be charged a nominal fee, perhaps in the form of a monthly service fee, to have access to the security software 12. Numerous charging arrangements may be used and are within the scope of the present disclosure.

Each time the customer executes a remediation, compliance check, or other use of the security software 12, the monitor 30 makes a transaction record which may be maintained in the log 32. Also, when the security software 12 executes a remediation, the log 32 maintains an indication of whether or not the remediation was successful. The billing component 44 may charge for any remediation, but the preferred embodiment only charges for successful remediations, not for remediations that fail.

The billing component 44 may be programmed to charge for a compliance check regardless of whether the checked system is compliant or not. In one embodiment, the security server 14 may communicate the entire log 32 to the back-office system 42 with all remediation and compliance checking information or may only return a listing of the successful remediations and total number of compliance checks. Numerous techniques for monitoring, logging, and charging for the use of the security software 12 will readily suggest themselves to one skilled in the art based on the teaching provided herein. For example, when a compliance check fails, a vulnerability may be identified. In this case, the security software 12 may suggest a remediation. The customer may not be charged for the compliance check, but only charged for the resulting remediation of the identified vulnerability.

The back-office system 42 may be the computer system of the developer or provider of the security software 12 or other entity, such as a business providing billing or other services for the developer or provider of the security software 12. The back-office system 42 may be a flash server or other system operable for delivering the remediations and updates to the security server 14. The back-office system 42 may also maintain the list of customers, security software 12 components, rates to be charged for particular uses, and so on. Also, charges for the remediations may vary and be based on the class of vulnerability. Examples of different classes of vulnerabilities include patches, misconfigurations, backdoors, unnecessary servers and accounts, and so on.

Also, charges may vary based on the number or timing of the uses of the security software 12. For example, there may be a higher per patch price for a single patch installation, but a lower per patch price for installing multiple remediations at one time. Similarly, there may be higher charges on a per device basis for performing a compliance check, compared to compliance checking all the computers or devices at the same time.

In one embodiment, the back-office system 42 and the security server 14 may maintain license and other information for various sub-components or modules which may comprise the security software 12. This is a useful means of maintaining control of the security software 12 while it resides on the customer's system. For example, when the security server 14 or security client 16 prepare for a compliance check, vulnerability analysis, or remediation, the security software 12 identifies the modules that the customer is permitted to access. This may be accomplished, for example, by using a license file (not shown) which is referenced each time before any module of the security software 12 is accessed to determine whether or not the customer is authorized to access the particular modules. This allows the developer or security system provider to de-activate all or portions of the security software 12 in the event the customer fails to make payments as agreed. This also allows for all the modules comprising the security software 12 to actually be resident on the security server 14 or security client 16, even though some modules are not accessible by the customer.

During a routine batch or other transfer of information, such as the log 32 from the security server 14 to the back-office system 42, the license file may be updated to activate or de-activate the various modules of the security software 12. The next time the security software 12 is run by the customer, the security software 12 checks the file to verify those modules which the customer has been provided access. In the event a customer attempts to access a deactivated module, the security software 12 will notify the customer that one or more modules have been de-activated, for example, for failure to make payments.

The security server 14 may also have various utilities for the customer to identify the costs or charges of the remediations. For example, the client may set a particular threshold cost and when the costs of certain uses, such as remediations or compliance checks exceed the threshold, the client may be notified of the excess charges. Also, the security software 12 is operable to provided information regarding different payment plans based on the use of the security system 12 by the customer. For example, when the customer's usage indicates that the customer might save money by going to a particular plan, then the system may be programmed to automatically recommend, such as via a pop-up on the graphical user interface, a change to a more economical plan, such as a perpetual license arrangement.

FIG. 2 illustrates a security dashboard 50 which may be a graphical user interface for the user, such as a customer accessing the security system 12 via the security server 14. The security dashboard 50 identifies the computers and resources 52 of the customer system for which the security system 12 is used. The security dashboard 50 may also include a listing of policies 54, compliance checks 56, vulnerabilities 58, and remediations 60. The policies 54 may provide for selection, such as via the pull-down menu or other techniques, the security policies for the selected computer or resource 52. The compliance check 56 may indicate, for example, the date of the last compliance check for the selected computer or resource 52, as well as whether or not the computer or resource 52 was in compliance during that check. The vulnerabilities 58 identify the vulnerabilities to the systems and may include the ability to select vulnerabilities to be remediated. The remediations 60 may identify patches and other remediations, and pertinent information relevant to those remediations 60, such as the versions, service packs, or other information.

The security dashboard 50 may also include an architecture view 62 which may enable an administrator to identify all of the computers 20 on the customer system such that the administrator can select displayed icons and obtain additional information on the related computers and resources 52. The security dashboard 50 may have other views, not shown, which may include management tools to disclose the cost of the remediations, reporting on remediations, vulnerabilities, compliance checks, policies and other information on the various computers and resources 52 of the customer computer system. Reports related to the numerous security aspects are also available from the security dashboard 50. The security dashboard 50 also includes tools to evaluate and rank all vulnerabilities based on the factors of risk and business value to enable users to prioritize vulnerability resolution.

According to one embodiment, the security system 12 may also push, via the security dashboard 50 or otherwise, information about new vulnerabilities and remediations to the security system 12 to notify customers about potential threats. In one embodiment, this may be accomplished by providing, via a client console, a scrolling message identifying the top threats for the day or other security information relevant to the customer. Additional information may be displayed via the security dashboard 50 and made available for use to manage security, which will readily suggest themselves to one skilled in the art and is within the spirit and scope of the present disclosure.

FIG. 3 is a flow chart of a method 80 for charging for security software based on its use. The method 80 includes, at a block 82, using the security software 12 to enhance security, such as on the customer computer system. At a block 84, the method includes monitoring use of the security software 12, such as by the monitor 30. The monitor 30, as previously discussed, may monitor and track use based on the remediations and/or compliance checks performed, although other uses may be monitored as well. At block 86, the method includes logging use of the security software 12, such as by recording each use into the log 32. The method includes, at a block 88, charging for the security software 12 based on its use. In this manner, the customer is not billed or charged to for the original deployment of the software on the customer's system on a periodic or other basis, but instead is only charged based on the customer's use of the security software 12.

In another embodiment, the present disclosure is directed to a system for use-based charging for other types of systems and software, such as use or event based charging for security software such as anti-virus software, intrusion detection and prevention software, or others. For anti-virus software, the system may monitor and charge based on each virus scan performed on a file, system, or other basis. In other embodiments, the virus system may monitor and charge the customer based on each virus identified, removed or file repaired, virus quarantined, or based on other types of virus related events. One specific example would have a first event for identifying a virus during a scan and a separate event for removing, repairing, bypassing, or quarantining etc the identified virus.

Where the system relates to intrusion detection and prevention software, the system may monitor and charge based on each security related event. These events, whether related to remediation, virus detection and repair activity, or intrusion or other system security, may be cumulatively referred to herein as security events. The security events may be charged for each intrusion detected, such as each attempt detected or prevented, for example. As with the other examples, detection may constitute one chargeable event and actions taken (prevention) may constitute a separate event.

Further, in any of the above described systems, additional flexibility may be provided by employing a combination of billing systems. For example, a subscription fee may be charged on some basis in combination with use based billing for each security event. For example, one method of billing may include a combination of charging a subscription fee to receive periodic remediation updates and compliance scans (or virus identification or intrusion detection), while event based charging may be used for actual remediation or prevention actions (remediating the vulnerability, cleaning the virus, or preventing the intrusion). In this example identification/detection of security related issues is being billed on a subscription, while actions to address/repair/remediate the issues is charged on a per event basis. Other combinations may equally follow as would understood by those of skill in the art.

The systems and methods described above may generally be implemented on a variety of different computer systems. FIG. 4 illustrates a typical, general-purpose computer system suitable for implementing some aspects the present system. The computer system 1330 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bidirectional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that the present system and method may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer-implemented system for use-based charging of security software, comprising:
   a security software to provide security for a computer system;
   a monitor component operable to monitor use of at least a portion of the security software; and
   a billing component operable to charge based on the use of the security software monitored by the monitor component;
   wherein the use of the security software is further defined as one of a remediation of a vulnerability and a compliance check;
   wherein the monitor component is further operable to create a log based on the remediation and the compliance check, and further wherein the billing component is operable to charge for the remediation and the compliance check based on the log.

2. The computer-implemented system of claim 1, wherein the security software and the monitor component are both operable on the computer system.

3. The computer-implemented system of claim 2, wherein the billing component is operable on another computer system.

4. The computer-implemented system of claim 1, wherein the security software further includes:
   a security client operable on a computer of the computer system; and
   a security server component operable to communicate with the security client, the security server component maintaining remediation information used by the security client to remediate the computer, the security server component further maintaining policies used by the security client to perform the compliance check of the computer.

5. The computer-implemented system of claim 4, wherein the security client is further operable to send a success signal to the security server component in response to successfully remediating the computer, the security client further operable to send a failure signal in response to the remediation of the computer being unsuccessful.

6. The computer-implemented system of claim 1, further comprising an activation component in communication with the security software and operable to selectively activate and deactivate at least a portion of the security software.

7. A method for charging for security software based on use, the method comprising:
using security software to enhance security for a computer; and
charging based on the use of the security software to enhance the security of the computer;
wherein the use of the security software is further defined as one of a remediation of a vulnerability and a compliance check;
wherein a monitor component is operable to create a log based on the remediation and the compliance check, and further wherein a billing component is operable to charge for the remediation and the compliance check based on the log.

8. The method of claim 7, wherein the charging is based on a number of vulnerability remediations and a number of compliance checks performed by the security software.

9. The method of claim 7, further comprising:
identifying the vulnerability on the computer;
remediating the vulnerability on the computer using the security software; and
charging based on remediating the vulnerability of the computer by the security software.

10. The method of claim 7, further comprising:
identifying policies for the computer;
performing the compliance check of the computer based on the policies; and
charging based on performing the compliance check of the computer.

11. The method of claim 7, further comprising:
using the security software on a plurality of computers;
logging each use of the security software to enhance the security of one or more of the plurality of computers; and
charging for the security software based on the log.

12. The method of claim 7, further comprising:
successfully remediating one or more vulnerabilities on the computer;
unsuccessfully remediating the one or more vulnerabilities on the computer; and
charging only for successful remediations of the computer.

13. The method of claim 7, further comprising notifying a user of the security software about a threat to the computer for which the security software is operable to secure.

14. The method of claim 7, further including where a customer of the security software fails to pay charges for use of the security software, disabling at least a portion of the security software.

15. A system for use-based charging of security software, comprising:
a first security client provided on a first customer computer;
a second security client provided on a second customer computer;
a security server provided on a customer server, the first and second security clients and the security server operable to enhance security on the first and second customer computers; and
a billing component operable to charge based on use of one or more of the first and second security clients and the security server to enhance security on the first and second customer computers;
wherein the use of the first and second security clients is further defined as one of a remediation of a vulnerability and a compliance check;
wherein a monitor component is further operable to create a log based on the remediation and the compliance check, and further wherein the billing component is operable to charge for the remediation and the compliance check based on the log.

16. The system of claim 15, wherein the log is used to maintain a record of use of one or more of the first and second security clients and the security server to enhance the security on the first and second customer computers, and wherein the billing component charges based on the record of the use.

17. The computer-implemented system of claim 1, wherein the monitor component makes a transaction record maintained in the log for the remediation of the vulnerability and the compliance check.

18. The computer-implemented system of claim 1, wherein the log maintains an indication of whether the remediation of the vulnerability was successful or unsuccessful.

* * * * *

UNITED STATES PATENT AND TRADEMARK OFFICE
CERTIFICATE OF CORRECTION

| | | |
|---|---|---|
| PATENT NO. | : 8,090,660 B2 | Page 1 of 1 |
| APPLICATION NO. | : 11/147881 | |
| DATED | : January 3, 2012 | |
| INVENTOR(S) | : Solomon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1964 days.

Signed and Sealed this
Thirteenth Day of March, 2012

David J. Kappos
*Director of the United States Patent and Trademark Office*